(12) United States Patent
Chen et al.

(10) Patent No.: US 10,908,006 B2
(45) Date of Patent: Feb. 2, 2021

(54) METHOD FOR FORMING MICROMACHINED LIQUID FLOW SENSOR

(71) Applicants: Chih-Chang Chen, Cupertino, CA (US); Liji Huang, Santa Clara, CA (US); Yahong Yao, San Jose, CA (US)

(72) Inventors: Chih-Chang Chen, Cupertino, CA (US); Liji Huang, Santa Clara, CA (US); Yahong Yao, San Jose, CA (US)

(73) Assignee: Siargo Ltd., Santa Clara, CA (US)

( * ) Notice: Subject to any disclaimer, the term of this patent is extended or adjusted under 35 U.S.C. 154(b) by 191 days.

(21) Appl. No.: 16/278,962

(22) Filed: Feb. 19, 2019

(65) Prior Publication Data
US 2020/0264022 A1  Aug. 20, 2020

(51) Int. Cl.
*G01F 1/684* (2006.01)
(52) U.S. Cl.
CPC .......... *G01F 1/6845* (2013.01); *G01F 1/6842* (2013.01); *G01F 1/6847* (2013.01)
(58) Field of Classification Search
None
See application file for complete search history.

(56) References Cited

U.S. PATENT DOCUMENTS

| | | | | |
|---|---|---|---|---|
| 5,656,773 A | * | 8/1997 | Neda | G01F 1/6845 |
| | | | | 73/204.26 |
| 5,780,173 A | * | 7/1998 | Harrington | B82Y 15/00 |
| | | | | 205/170 |
| 5,852,239 A | * | 12/1998 | Sato | G01F 1/6845 |
| | | | | 73/204.26 |
| 2009/0016403 A1 | * | 1/2009 | Chen | G01F 1/6845 |
| | | | | 374/45 |
| 2009/0158859 A1 | * | 6/2009 | Huang | G01F 1/6845 |
| | | | | 73/861.351 |
| 2010/0089146 A1 | * | 4/2010 | Morita | G01F 1/6845 |
| | | | | 73/204.26 |

(Continued)

*Primary Examiner* — David J Bolduc (57) ABSTRACT

The micromachined liquid flow sensor devices are enclosed with silicon nitride film as passivation layer to protect device from penetration of liquid into device and avoid the damages of erosion or short circuit etc. One thin layer of silicon dioxide is deposited underneath the silicon nitride layer to enhance the adhesion and reliability of the passivation layer for various applications. The incorporation of silicon dioxide film had successfully provided reliable passivation protection especially for microfluidic devices application. In order to avoid flow turbulence caused by wire bonding wires, the wire bonding wires are omitted by deploying through-substrate conductive vias whereas connected to the carrier printed circuit board of sensor chip. The present invention disclosed a novel micromachining process and designed structure to form hermit sealing between the sensor chip and the carrier printed circuit board. The hermit sealing underneath the sensor chip can protect the bonding connections from exposing to liquid flow media and avoid short circuitry or induce undesired chemical corrosion. More particularly, the embodiments of the current invention relates to formation steps of a micromachined liquid flow sensor including passivation and protection of bonding connection to its carrier printed circuit board, which is therefore capable to offer superb accuracy and reliability for liquid flow measurement.

10 Claims, 6 Drawing Sheets

(56) References Cited

U.S. PATENT DOCUMENTS

| | | | |
|---|---|---|---|
| 2010/0139389 A1* | 6/2010 | Morita | G01F 5/00 |
| | | | 73/204.11 |
| 2011/0030468 A1* | 2/2011 | Chen | G01F 1/6845 |
| | | | 73/204.26 |
| 2013/0098150 A1* | 4/2013 | Sella | G01F 1/698 |
| | | | 73/204.17 |
| 2014/0190251 A1* | 7/2014 | Huang | G01F 1/692 |
| | | | 73/204.24 |
| 2014/0190252 A1* | 7/2014 | Huang | G01F 1/6845 |
| | | | 73/204.25 |
| 2014/0283595 A1* | 9/2014 | Huang | G01F 1/6845 |
| | | | 73/204.17 |
| 2017/0097252 A1* | 4/2017 | Huang | G01F 1/692 |
| 2017/0248627 A1* | 8/2017 | Shrauger | G01P 5/12 |
| 2017/0356772 A1* | 12/2017 | Huang | G01F 1/3218 |
| 2018/0299308 A1* | 10/2018 | Huang | G01F 1/7084 |
| 2019/0301908 A1* | 10/2019 | Kisban | G01F 1/684 |

\* cited by examiner

METHOD FOR FORMING MICROMACHINED LIQUID FLOW SENSOR

BACKGROUND OF THE INVENTION

Measurement of liquid flow rate in a microfluidic configuration is often a great challenge as the technique is limited by the volumetric flow channel which is slow in response and bulky with uncertain errors. Coriolis liquid flow meter is one of the most prevailed technologies in this scope. However, Coriolis liquid flow meter is unmerited by its bulky and costly characteristics whereas it generally requires complicated manufacturing process for mass production. Another alternative technology is the Pitot tube by measuring the differential pressure of two locations inside flow passage to derive the flow rate. This technology nevertheless is practically restricted by the detriment of inaccuracy. As for the current mechanical infusion pumps, they do not have any controls in dosing speed and prevention of embolism, therefore the development of micromachined liquid flow sensor for general purpose applications would be very valuable and desirable. For some homecare medical applications, one of the most important issues is to minimize the cost structure and to immune from cross contamination, therefore disposable capability would be very favorable for this implementation. There are quite a few of existing technologies for attacking the problems. Prevailing technology such as optical or ultrasonic can theoretically identify the air embolism problems while providing the measurement of the flow rate.

Disposal types of liquid flow sensors in many home care medical apparatus have been required to avoid cross contamination. Mayer et al. (U.S. Pat. No. 6,813,944) teaches a MEMS thermal mass flow sensor for such purpose. The sensor is however placed outside of sidewall of a highly thermal conductive micro-tube, such that the fluid flow can still be sensed with a higher power operation. But this approach suffers high cost issues due to its sensor packaging with consistent long term drifting. Current medical applications requirement for disposable units in dosing, infusion pump and smart injection, require a more accurate measurement of medical grade liquid medication in a micro channel. One of the home care medical devices such as infusion pump have comprised a micromachining liquid flow sensor to handle the micro flow during medicine injection so that a constant injection rate can be well-maintained for accurate dosage and optimum effects. The threshold of feasibility for disposal type of liquid flow sensor will significantly rely on the cost structure of sensor technology. It would therefore be especially desirable to develop a low-cost and reliable micro liquid flow sensor which could be applied in various applications of microfluidics. The current invention will apply microfabrication and thin film technology to produce the liquid flow sensor, which would naturally inherits the advantages of small factor, high consistency, low cost, and easeness of mass production.

SUMMARY OF THE INVENTION

The invention is to form micromachining liquid flow sensors which can be applied on microfluidics, medical or biomedical applications. In the current invention, a novel micromachined liquid flow sensor device is enclosed with silicon dioxide/silicon nitride film as passivation layer to protect device from penetration of liquid into device and to avoid damages from erosion or short circuitry. One thin layer of silicon dioxide is deposited before the deposition of silicon nitride layer to enhance the adhesion and reliability of the passivation layer for various applications. The incorporation of silicon dioxide film is functioning as an adhesion enhance layer and have successfully provided a better and more reliable passivation method especially for microfluidic devices application compared to the passivation method with sole silicon nitride film.

The micromachined liquid flow sensor has a number of through-substrate conductive vias which are applied to electrically connect the functional device on top surface of sensor chip to the bonding pads on bottom surface of sensor chip. The bonding pads on the bottom surface of sensor chip will be as well metal bumping bonded to the bonding pads on PCB to complete the electrical connection with an external circuitry.

In order to prevent the bonding connections between sensor chip and the carrier PCB from exposing to flow media, one extra innovative rectangular enclosure ring pattern, which is routing along the four chip edges to form a rectangular enclosure, is applied to provide a protective shield from flow media for all the bonding pads. Therefore, the micromachined liquid flow sensor chip in the current invention will be mechanically secured on top of the carrier printed circuit board (PCB) by the metal bonding. All the bonding pads on sensor chip with the PCB will be surrounded and protected by the added hermetically bonded enclosure. The formation of the bonding shield and the bonding electric contacts can be performed synchronously without another addition of extra process steps.

More specifically, the current invention can be applied to applications requiring measurement of liquid flow in a micro channel with a strict hygienic requirement. The micromachining liquid flow sensor is fabricated on low cost substrates made of Pyrex or Boron Silica. With the advantages of thin film micromachining fabrication process, the liquid flow sensors can be mass produced with very high uniformity of characteristics comparing to the conventional mass production methods. This invention effectively provides disposable solutions, which are very cost effective, based on mass production of thin film micromachining technology. The deployed techniques in the current invention includes standard micromachining process such like e-gun vapor deposition, sputtering, plasma enhanced vapor deposition (PECVD) for dielectric film, photolithography, wet chemical etching, plasma dry etching etc., which are similar to standard CMOS semiconductor fabrication process; thereof it provides easy manufacturability and significantly reduce the deviation among devices. In the current invention, we present the design and manufacturing steps for such low cost liquid flow sensor. The micromachining liquid flow sensor chips based on thermal calorimetric or time-of-flight measuring principle are demonstrated and the object is reached by the embodiments of claims.

BRIEF DESCRIPTIONS OF THE DRAWINGS

The present invention will be more fully and completely understood from a reading of the Description of the Preferred Embodiment in conjunction with the drawings, in which.

DETAILED DESCRIPTION OF THE PREFERRED EMBODIMENTS

Figure 1:
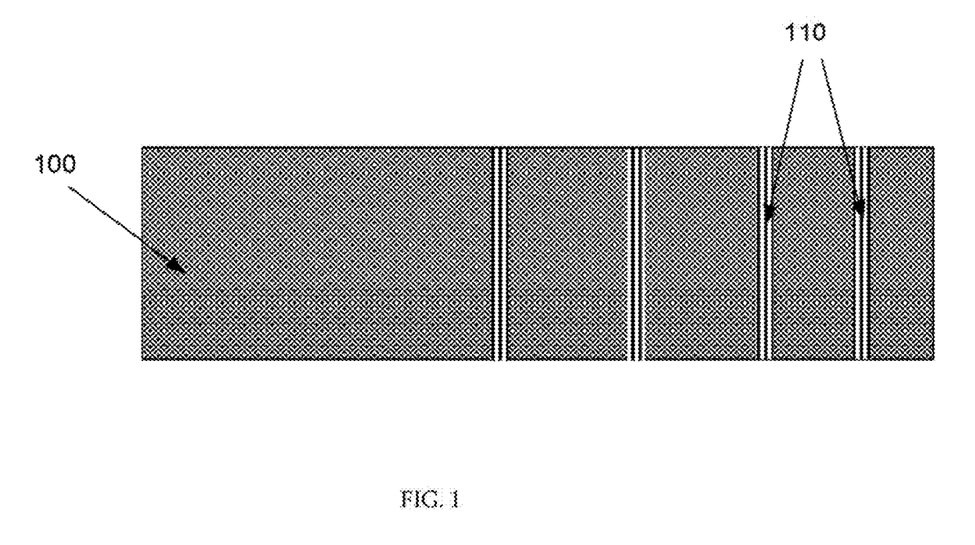
FIG. 1—is a cross section view of the started wafer with embedded through-wafer conductive vias.
Figure 2:
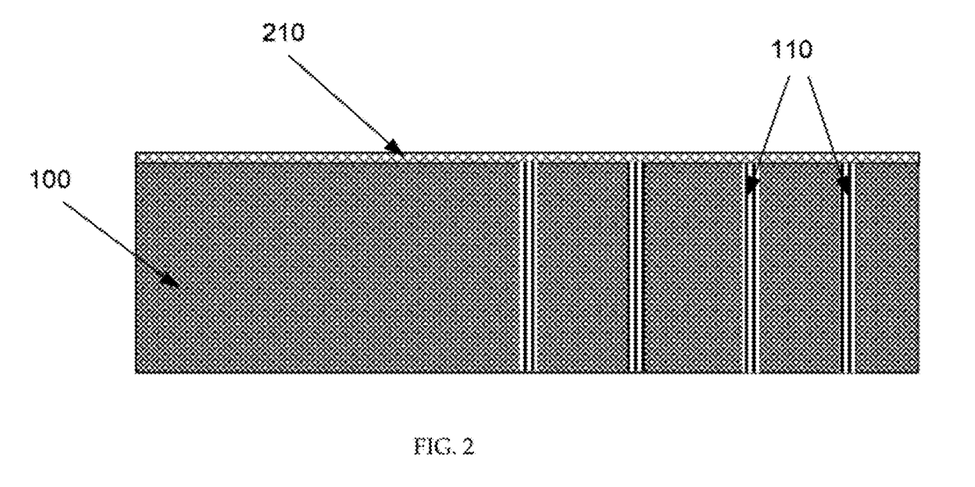
FIG. 2—is a cross section view of the started wafer with a PECVD deposited silicon nitride film on top surface of the substrate as a sodium ion diffusion barrier.
Figure 3:
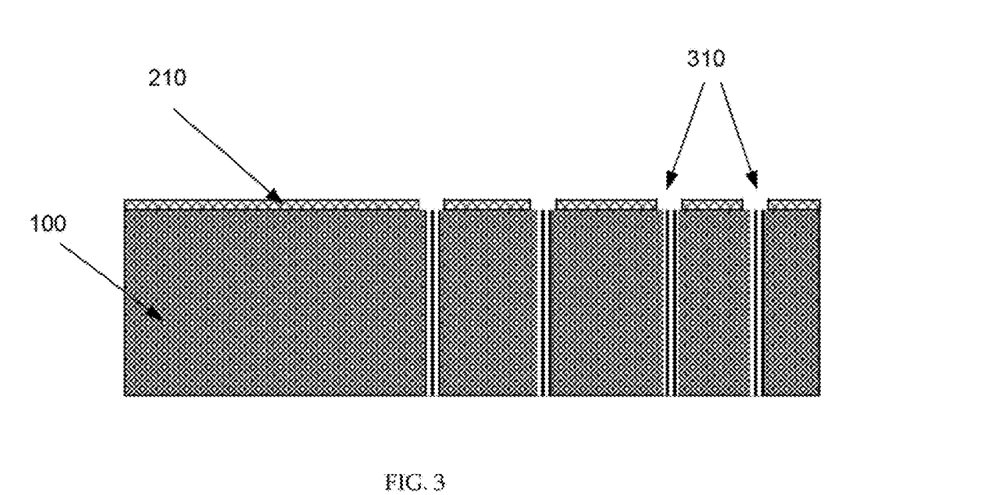
FIG. 3—is a cross section view of the liquid flow sensor after the first photolithography and etch process, wherein the first silicon nitride was etched to open contact windows for the through-substrate conductive vias.
Figure 4:
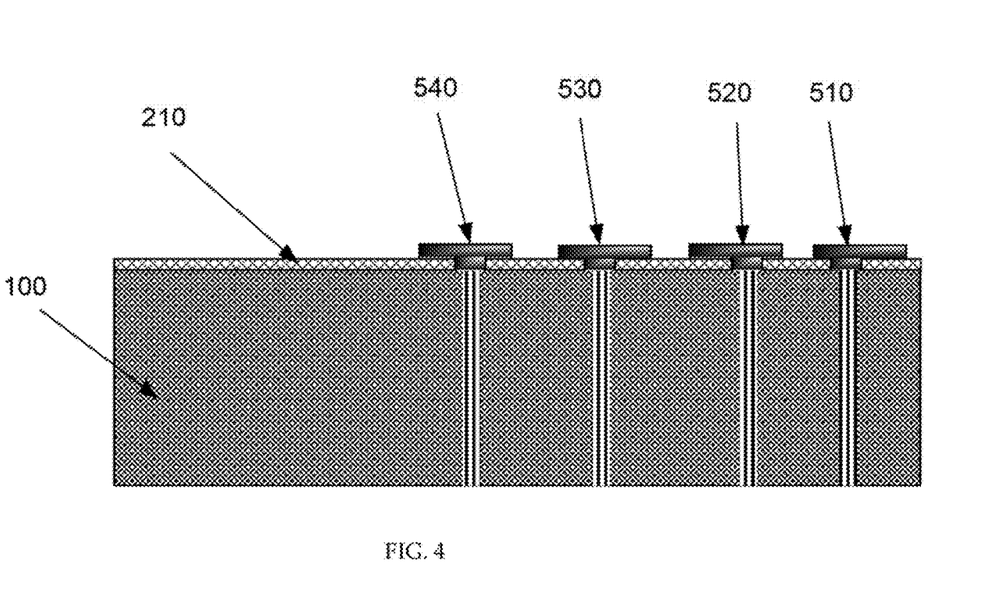
FIG. 4—is a cross section view of the liquid flow sensor after the metal deposition for thermistors and the thermistors are electrically connected to the through-substrate conductive vias.
Figure 5:
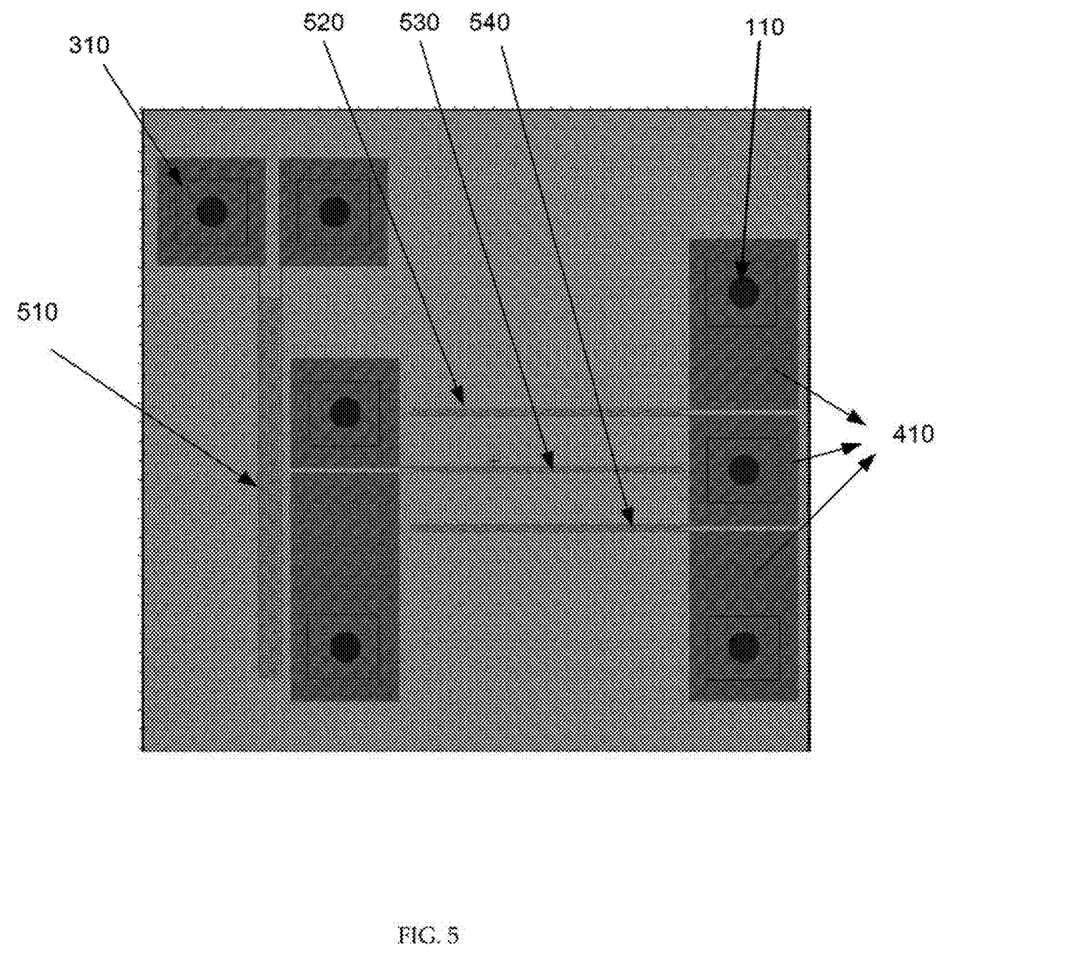
FIG. 5—is a schematic view of top surface of the liquid flow sensor to show the arrangement of thermistors and via connections.
Figure 6:
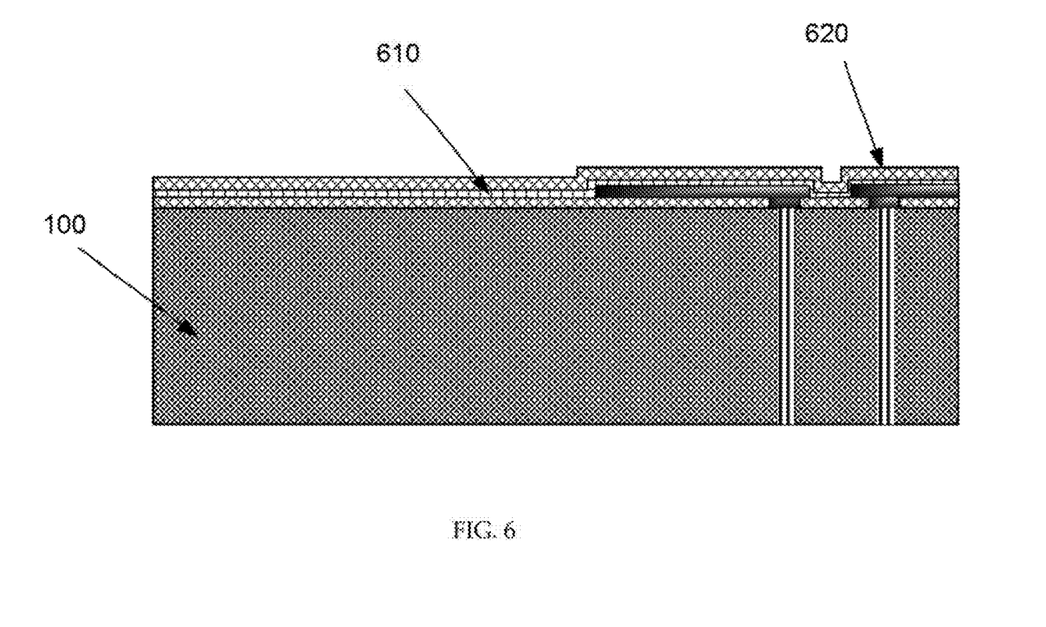
FIG. 6—is a cross section view of the liquid flow sensor after the deposition of passivation layer including silicon dioxide film and silicon nitride film.
Figure 7:
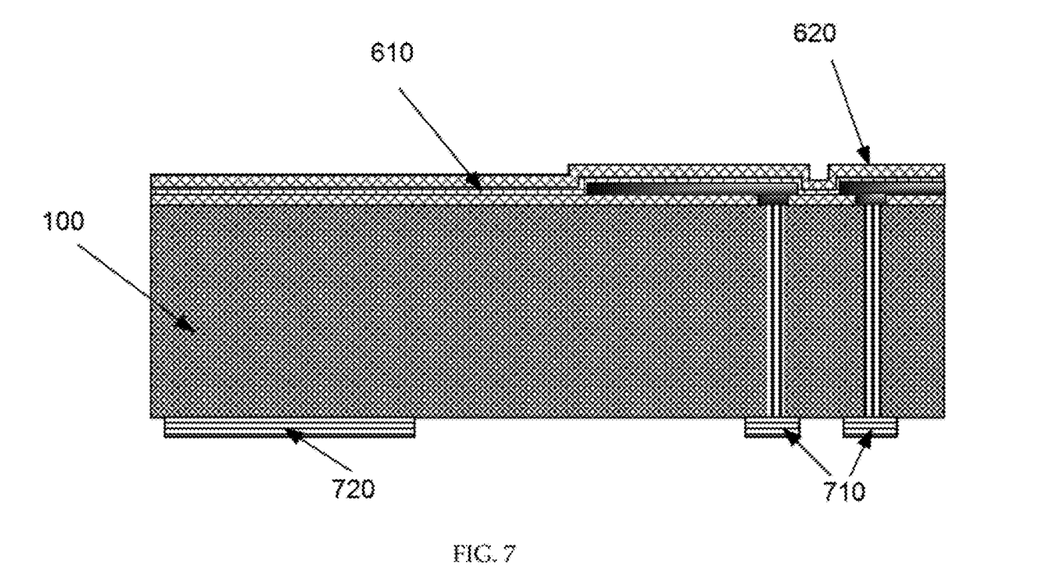
FIG. 7—is a cross section view of the liquid flow sensor after the deposition of bonding metal layers on the bottom surface of the liquid flow sensor.
Figure 8:
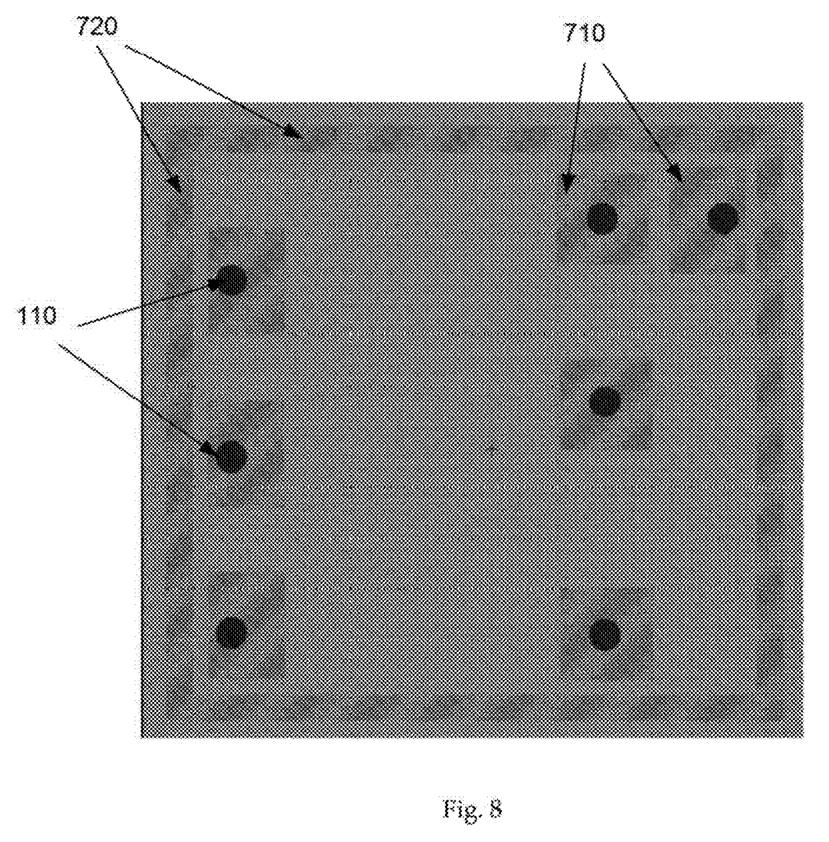
FIG. 8—is a schematic view of the bottom surface of the liquid flow sensor to show the arrangement of bonding pads and rectangular enclosure ring pattern, which is used to form a hermetic bonding for protecting the bonding pads.
Figure 9:
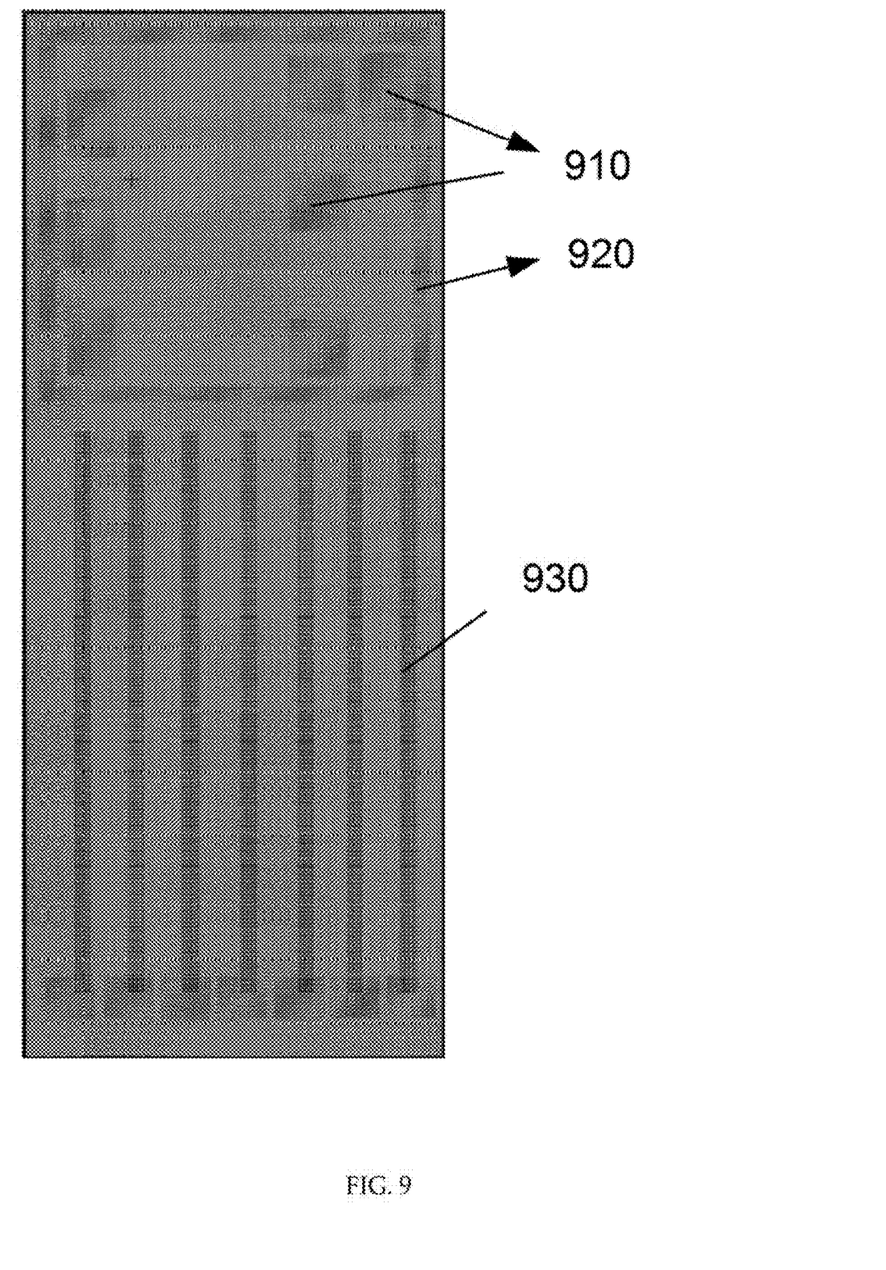
FIG. 9—is a schematic top view of the carrier PCB, which is shown the electroplated gold bonding pads for electrical connection and one rectangular enclosure ring pattern for hermetic bonding seal.

In the current invention, FIG. 1 shows a cross section view of the glass substrate (100) with embedded through-substrate conductive vias (110), which is usually formed by conductive materials such as copper wires, tungsten wires or silicon micro-columns. The through-substrate conductive vias can provide electric connections between the thermistors on the top surface of the glass substrate to the bonding pads on the bottom surface of the glass substrate. The glass substrate is commonly around the thickness of 550 um. The FIG. 2 is shown the cross section view of the glass substrate after a PECVD silicon nitride film (210) deposition on the top surface of the glass substrate as a sodium ion diffusion barrier, which can prevent the diffusion of sodium ions from the glass substrate into the thermistors. In the FIG. 3, the diffusion barrier diffusion barrier film (210) is patterned to open contact windows (310) by the first photolithography and etch process, whereas the contact windows (310) are used for the electrical connections between the thermistors and the through-substrate conductive vias (110). In the FIG. 4, the schematic view shows the cross section of the liquid flow sensor after the metal deposition and etching process by the second photolithography to form the thermistors. The formed thermistors are including one heater thermistor (530), one ambient temperature sensing thermistor (510), one upstream temperature sensing thermistors (540) which is disposed on upstream side of the heater thermistor to measure temperature distribution of the liquid flow media before passing through the heater thermistor, and one downstream temperature sensing thermistor (520) which is disposed on downstream side of the heater thermistor to measure another temperature distribution of the liquid flow media after passing through the heater thermistor (530). The FIG. 5 is a schematic view from the top surface showing the arrangement of the heater thermistor (530), the ambient temperature sensing thermistor (510), the upstream temperature sensing thermistor (540), and the downstream temperature sensing thermistor (520). The electric connections from thermistors to the conductive vias are achieved by the metal contacts (410). Therefore, with connecting to an external circuitry, the flow rate of the liquid flow media can be calibrated and measured through the unbalanced shift of the two measured temperature distribution caused by the movement of flow media. In FIG. 6, it is a cross section view shown the liquid flow sensor with passivation layer deposited. The passivation layer is formed by two consecutive depositions of silicon dioxide (610) film and silicon nitride (620) film carried out by plasma enhanced chemical vapor deposition method, whereas the silicon dioxide film (610) is serving as an adhesion enhancive layer for the silicon nitride (620) film to the surface of liquid flow sensor chip. The thickness of the silicon dioxide film is ranged from 800 angstroms to 1200 angstroms, and the thickness of the silicon nitride film is ranged from 5000 angstroms to 6500 angstroms. The thickness of the silicon nitride is critical to the effectiveness of protection and the detection sensitivity of flow measurement, which are two trade-off factors. The thicker layer of silicon nitride will provide a better protection for the sensor chip but on the other hand, will also deteriorate the sensor performance by reducing the thermal sensitivity. The embodiment of the applied silicon dioxide is very critical to the success of the liquid flow measurement application. Without the deployment of silicon dioxide film as an adhesion enhance layer, the liquid flow sensor chip could not endure reliable long term operation due to vulnerable adhesion between silicon nitride and sensor chip surface, which usually causes damages of peeling-off or pin holes on chip surface. The silicon dioxide film functioning as an adhesion enhance layer have successfully provided a better and more reliable passivation method especially for a microfluidic device application compared to the passivation layer with sole silicon nitride film. In the FIG. 7, it is shown the cross section view of sensor chip after deposition of bonding metal film system on the bottom side of the sensor chip. The bonding pads (710) and a rectangular enclosure ring pattern (720) are formed and patterned by third photolithography and etch process. The bonding metal film system are commonly used for metal ball bumping bonding technology, which can be selected from a group of metal film systems consisting of nickel/gold, chromium/copper, titanium/platinum/gold. The liquid flow sensor chip will perform a metal bumping process to the carrier PCB which is shown in FIG. 9. In FIG. 9, the carrier PCB has electroplated gold bonding pads (910) and one electroplated gold rectangular enclosure ring pattern (920) which is dimensionally matched and identical to the rectangular enclosure ring pattern on the bottom surface of the glass substrate. The pattern (720) on the bottom surface of glass chip will be metal bumping to the pattern (920) on the carrier PCB to form hermetic bonding seal synchronously with the formation of electrical connection on bonding pads, therefore there is no any additional process step to introduce. The multi-layer carrier PCB can provide an electrical interconnection (930) to an external circuitry through different conducting layer. The great advantage of this embodiment in current invention, is that all the bonding pads on the bottom surface of the glass substrate will be enclosed by the rectangular enclosure ring pattern hermetic bonding seal, therefore the bonding pads will be protected from any exposure to the liquid flow media. Furthermore, the through-substrate conductive vias connections can make the liquid flow sensor chip electrically connect to an external circuitry without using bonding wires which can greatly introduce liquid flow turbulence. Therefore using through-substrate conductive vias is a great advantage for reducing the liquid flow turbulence and enhancing the measurement accuracy.

While the invention has been described in terms of what are presently considered to be the most practical and preferred embodiments, it is to be understood that the invention need not be limited to the disclosed embodiment. On the contrary, it is intended to cover various modifications and similar arrangements included within the spirit and scope of the appended claims which are to be accorded with the broadest interpretation so as to encompass all such modifications and similar structures. Therefore, the above description and illustration should not be taken as limiting the scope of the present invention which is defined by the appended claims.

What is claimed is:

1. A method for forming a micromachined liquid flow sensor chip comprising steps of:
   providing one glass substrate with through-substrate conductive vias;
   depositing a first layer of silicon nitride film by a plasma enhanced chemical vapor deposition (PECVD) on a top surface of the glass substrate;
   patterning openings on a top surface of the through-substrate conductive vias by a first photolithography and an etching process, wherein the etching process will only etch away the silicon nitride film on the top of the glass substrate to expose the through-substrate conductive vias and make the through-substrate conductive vias ready for a contact with a metal interconnection;
   depositing a metal film system on the top surface of the glass substrate;
   patterning the metal film system for thermistors by a second photolithography and another etching process, wherein the thermistors are connected to the through-substrate conductive vias;
   depositing one layer of silicon dioxide film and then a second silicon nitride film consecutively by PECVD on the top surface of the glass substrate as protective passivation layer for the liquid flow sensor chip; wherein the silicon dioxide layer underneath the second silicon nitride film is an adhesion enhance layer for the second silicon nitride film to the top surface of the thermistors and other areas of the glass substrate;
   depositing a bonding metal film system on a bottom surface of the glass substrate;
   patterning the bonding metal film system on the bottom surface of the glass substrate as bonding pads pattern and one rectangular enclosure pattern by a third photolithography and another etching process, wherein the bonding pads and the rectangular enclosure pattern are used to bond to a carrier minted circuit board (carrier PCB), and wherein the rectangular enclosure pattern bonded to the carrier PCB provide a hermetic seal to protect the bonding pads on the bottom surface of the glass substrate from exposing to a liquid flow media.

2. The method of claim 1, wherein the first silicon nitride film is a diffusion barrier to prevent sodium ions of the glass substrate diffusing into the thermistors on the top surface of the substrate.

3. The method of claim 1, wherein the through-substrate conductive vias are formed by a material selected from a group consisting of copper wires, tungsten wires or silicon micro-columns.

4. The method of claim 3, wherein thickness of the silicon dioxide film is ranged from 800 angstroms to 1200 angstroms; and wherein thickness of the silicon nitride film ranges from 5000 angstroms to 6500 angstroms.

5. The method according to claim 1, wherein the through-substrate conductive vias provide electric connections between the thermistors on the top surface of the glass substrate to the bonding pads on the bottom surface of the glass substrate.

6. The method according claim 1, wherein the carrier PCB has electroplated gold bonding pads and one electroplated gold rectangular enclosure pattern which is dimensionally matched and identical to the rectangular enclosure pattern on the bottom surface of the glass substrate.

7. The method according claim 1, wherein electrical connections from the bonding pads on bottom surface of the glass substrate to the electroplated gold bonding pads of the carrier PCB and the hermetic bonding seal bonded between the glass substrate with the carrier PCB are both synchronously formed by a metal ball bumping process.

8. The method according to claim 1, wherein the thermistors in the micromachined liquid flow sensor includes:
   one heater thermistor which is used to elevate a temperature of the liquid flow media while passing through the heater thermistor;
   one ambient temperature sensing thermistor which is disposed on downstream side of the liquid flow media and used to measure surrounding temperature of the liquid flow media;
   one upstream temperature sensing, thermistors which is disposed on upstream side of the heater thermistor to measure a temperature distribution of the liquid flow media before passing through the heater thermistor; and
   one downstream temperature sensing thermistor which is disposed on downstream side of the heater thermistor to measure another temperature distribution of the liquid flow media after passing through the heater thermistor.

9. The method according claim 1, wherein the thermistors are made of metal with a high temperature coefficient of resistivity (TCR) values, which is selected from a group of metals which include platinum, nickel, or tungsten.

10. The method according to claim 1, wherein the bonding pads and the rectangular enclosure ring pattern on the bottom surface of the glass substrate are made of the same metal film system commonly used for the metal ball bumping bonding technology, which is selected from a group of metal film systems which include nickel/gold, chromium/copper, or titanium/platinum/gold.

* * * * *